United States Patent
Beck

(10) Patent No.: US 7,653,521 B2
(45) Date of Patent: Jan. 26, 2010

(54) METHOD FOR PROJECTING AND/OR CONFIGURING A PROJECT

(75) Inventor: Hans-Joachim Beck, Rheinstetten (DE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 10/564,210

(22) PCT Filed: Jul. 9, 2004

(86) PCT No.: PCT/EP2004/007593

§ 371 (c)(1),
(2), (4) Date: Jan. 9, 2006

(87) PCT Pub. No.: WO2005/006223

PCT Pub. Date: Jan. 20, 2005

(65) Prior Publication Data

US 2006/0195207 A1 Aug. 31, 2006

(30) Foreign Application Priority Data

Jul. 10, 2003 (DE) .................. 103 31 312

(51) Int. Cl.
*G06G 7/66* (2006.01)
(52) U.S. Cl. ................. 703/6; 703/1; 703/13; 709/202; 717/103; 717/120; 717/122
(58) Field of Classification Search .................. 703/1, 703/6, 13; 715/733, 741, 751; 709/202; 717/103, 120, 122
See application file for complete search history.

(56) References Cited

U.S. PATENT DOCUMENTS

| 4,914,567 A | * | 4/1990 | Lipkis et al. ................... 700/83 |
| 6,108,662 A | * | 8/2000 | Hoskins et al. ............. 707/102 |
| 6,298,319 B1 | | 10/2001 | Heile et al. |
| 7,272,815 B1 | * | 9/2007 | Eldridge et al. ............. 717/101 |

FOREIGN PATENT DOCUMENTS

WO    WO 02/088909 A2    11/2002

OTHER PUBLICATIONS

Siemens AG, Siemens Catalogue Simatic, Prozessleitsystem ST PCS 7, Chapter 3, May 2003 edition, pp. 1-14.
Siemens AG, "Industrial Ethernet", Advance Produkte, Systeme, Lösungen für Totally Integrated Automation, vol. 1, No. 1/2002, Oct. 2002, XP002305416, pp. 30-31.
Thomas Reuter, Olav Gatzemeier and Hermann Richter, "Projektieren Loest Das Programmieren AB" Elektronik, Franzis Verlag GmbH, Munchen, Germany, vol. 46, No. 3, Feb. 4, 1997, pp. 58-64, XP000722490.

* cited by examiner

*Primary Examiner*—Paul L. Rodriguez
*Assistant Examiner*—Jason Proctor

(57) ABSTRACT

The invention relates to a method, an engineering system and a programming device which simplify the projection and/or configuration of a project which represents an automation device for controlling a technical facility. For this purpose, the project engineer simply deposits in a project references that indicate which project components have to be deposited. Copies of said project components are automatically made and are deposited in the project on the programming device. The invention reduces error-proneness and projection complexity.

12 Claims, 3 Drawing Sheets

METHOD FOR PROJECTING AND/OR CONFIGURING A PROJECT

CROSS REFERENCE TO RELATED APPLICATIONS

This application claims priority to the German application No. 10331312.5, filed Jul. 10, 2003 and to the International Application No. PCT/EP2004/007593, filed Jul. 9, 2004 which are incorporated by reference herein in their entirety.

FIELD OF INVENTION

The invention relates to a method for designing and/or configuring a project which represents automation equipment for controlling a plant, project design blocks being stored in a library in a memory of an engineering system, which memory is connected to a programming device of the engineering system, and copies of the project design blocks required for designing and/or configuring the project being storable on the programming device. The invention also relates to an engineering system for designing and/or configuring a project and a programming device for an engineering system of this kind.

BACKGROUND OF INVENTION

An engineering system of the kind referred to at the beginning is known from Siemens Catalogue ST PCS 7, Chapter 3, May 2003 edition. This engineering system is a component of a process control system which controls a plant and is, in particular, provided for the configuration of hardware and/or software components, for the design of communications networks and continuous and sequential process operations, and also for the design of operating and observation strategies and for the creation of recipes for batch processes. The project design blocks required for designing and/or configuring a project which represents the automation equipment to be designed are components of a library which can be stored in a memory of a programming device or of a server. Furthermore, the programming devices, which are involved in design and/or configuration in a multiuser operation for example, can access this common library. The project design blocks of the automation equipment to be designed that are needed for a project comprising a plurality of part projects are saved in the form of copies in the programming devices, and design engineers have to copy the project design blocks themselves. These copies stored locally on the programming devices enable each part project to be processed autonomously, and an online connection to the server's library is initially no longer required. It is possible that the library will be updated, that is to say, new versions (revision levels) of these project design blocks will be stored in the library, in which case the design engineers are responsible for again storing appropriate copies of these new revision levels in the programming devices. This procedure is prone to error and involves a considerable amount of work in respect of the handling of the project design blocks.

SUMMARY OF INVENTION

An object of the present invention is to simplify a method for designing and/or configuring a project.

This object is achieved by the claims.

It is advantageous for a design engineer to have to store only references in a project, and the copies of the project design blocks are then automatically copied and stored in the project on the programming device. Proneness to error and project design effort are thereby reduced.

In an embodiment of the invention, copies already stored in the project can, if so required, be updated by copies, updating being carried out only on the basis of a user request. This makes it possible both to provide the project with current project design blocks and to prevent the updating of, for example, parts of a project which are already certified. In the latter case, updating would necessitate the re-certification of these part projects.

In a further embodiment of the invention, it is possible to prevent existing copies in a project from being inadvertently updated. Assuming that already designed and certified automation equipment is to be expanded, in this case the references relating to project design blocks in the library which are a component of the already certified project are advantageously erased. By contrast, references relating to project design blocks in the library which are required in the course of the expansion are not erased, so that current project design blocks can be used for this expansion.

According to another embodiment, it is possible to ensure that the copies of a project design block needed for the part projects have the same revision level.

Further advantageous embodiments of the invention will emerge from further independent claims.

BRIEF DESCRIPTION OF THE DRAWINGS

The invention, amplifications and developments are described in more detail and explained below with reference to the drawing, which illustrates an exemplary embodiment of the invention and in which.

DETAILED DESCRIPTION OF INVENTION

Figure 2:
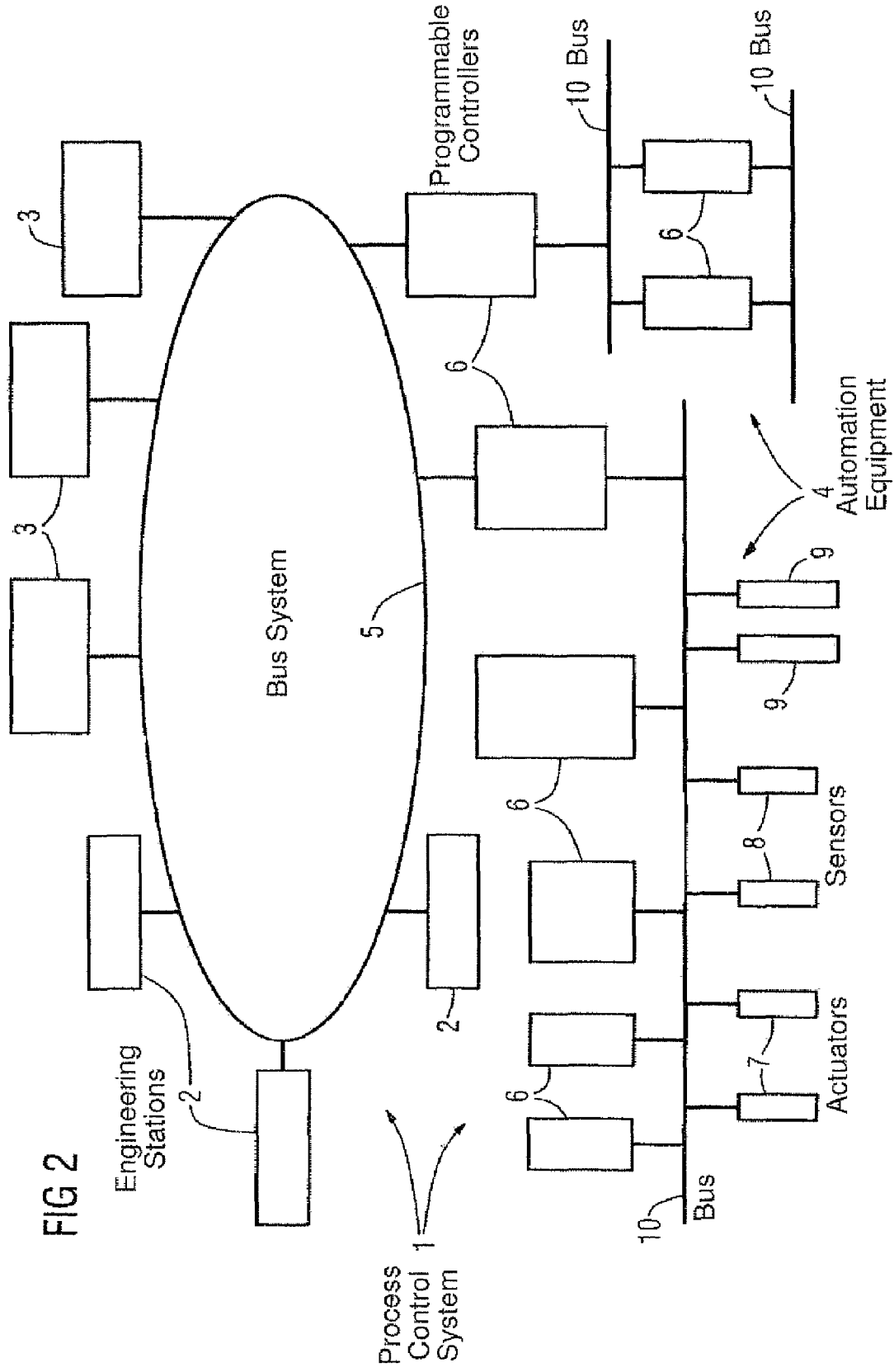
FIG. 2 is a process control system.

Reference is made first to FIG. 2, which shows a process control system 1 which is known per se. The process control system 1 has an engineering system 2, an operating and observation system 3 and designed and configured automation equipment 4, the engineering system 2 being provided for the design and/or configuration of automation equipment. The automation equipment 4, which is connected to the engineering system 2 and to the operating and observation system 3 via a bus system 5 and bus interfaces (not shown here), comprises different programmable controllers 6, actuators 7 and sensors 8, as well as further automation components 9 required for the control of a plant. The programmable controllers 6, which are interconnected via the bus system 5 and/or further suitable bus systems 10, can be of different designs. Thus, programmable controllers are usually provided to perform small, moderate and relatively large automation tasks within the automation equipment 4, micro-programmable controllers being usable for the performance of small automation tasks, programmable small controllers being usable for the performance of moderate automation tasks, and high-performance programmable controllers being usable for the performance of more complex automation tasks.

The hardware and software components, that is to say the programmable controllers, operating and observation devices, bus systems, actuators and sensors, and the control programs with which the automation equipment 4 is to be provided, are dependent on the complexity of the plant to be controlled and of the control task. Furthermore, the requisite hardware and software components of the automation equipment 4 can be designed and/or configured by the engineering system 2.

Figure 1:
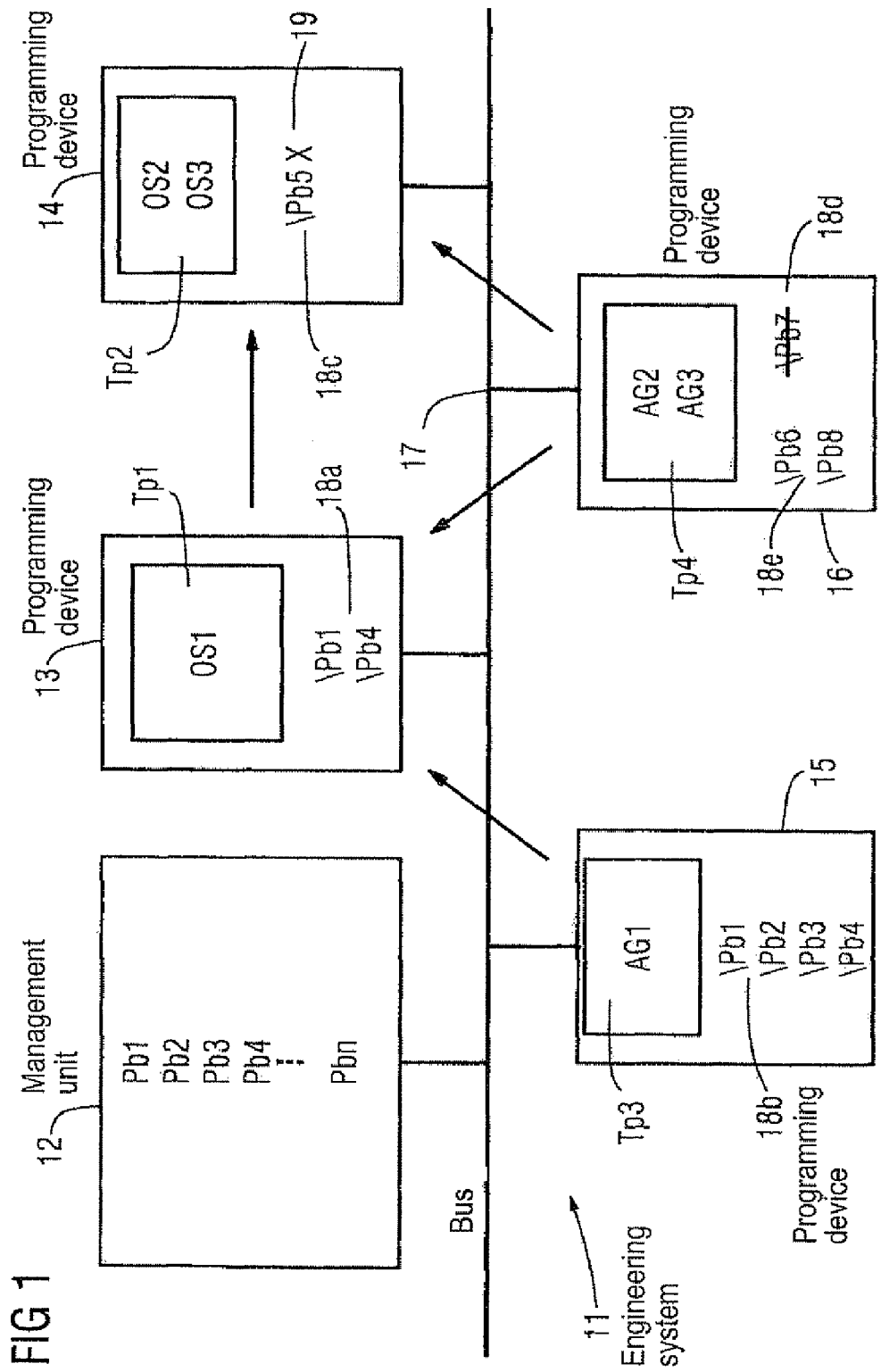
FIG. 1 is an engineering system.

Reference is made below to FIG. 1, which illustrates an engineering system 11 for the design and/or configuration of hardware and software components of automation equipment. For this purpose, in the present example the engineering system 11 has a management unit 12 and four programming devices 13, 14, 15, 16, the management unit 12 and the programming devices 13, 14, 15, 16 being interconnected via a bus system 17. The management unit 12, which can naturally be part of one of the programming devices 13 . . . 16, divides a project, which represents the automation equipment and which, on the basis of the automation task to be performed, incorporates the information concerning the requisite hardware and software components, into four part projects Tp1, Tp2, Tp3, Tp4. Of these part projects, the part project Tp1 is to be executed by the programming device 13, the part project Tp2 by the programming device 14 and, accordingly, the part project Tp3 by the programming device 15 and the part project Tp4 by the programming device 16. For this purpose, all the hardware and software components of the automation equipment required for design and/or configuration can be virtually displayed on display devices of the programming devices 13 . . . 16. For example, it is possible to display on the display devices views of the units needed for the programmable controllers, for the operating and observation systems and for the further hardware components such as input and output modules, field devices and bus systems, as well as views of software blocks for creating control programs for the programmable controllers. For this purpose, project design blocks for these automation components are stored for a design engineer in the form of software objects in a control library of the management unit 12. The part project Tp1 comprises the design of an operating and observation station OS1; the part project Tp2 comprises the design of operating and observation stations OS2, OS3; the part project Tp3 comprises the design of a programmable controller AG1; and the part project Tp4 comprises the design of programmable controllers AG2, AG3. Furthermore, the part projects Tp1 and Tp3, the part projects Tp1 and Tp2 and the part projects Tp2 and Tp4 are functionally linked, this being indicated in FIG. 1 by means of arrows. For example, the part projects Tp2 and Tp4 are functionally linked such that batch data of the programmable controllers AG2, AG3 are to be exported to the operating and observation stations OS2, OS3 or such that connection data are to be transferred between the programmable controller AG1 and the operating and observation station OS1. In a memory (not shown here) of the management unit 12 there are stored centrally, in a library, project design blocks Pb1, Pb2, Pb3, . . . Pbn, which are provided for the design an d/or configuration of the part projects Tp1, . . . , Tp4 on the programming devices 13, 14, 15, 16.

It is assumed that a user of the programming device 13 needs copies of the project design blocks Pb1 and Pb4 for the design of the part project Tp1, and that a further user of the programming device. 15 needs copies of the project design blocks Pb1, Pb2, Pb3 and Pb4 for the design of the part project Tp3. For this purpose, during a project design phase the user of the programming device 13 using a suitable software tool stores in a memory of the programming device 13 a reference 18a, which indicates to a software routine of the management unit 12 that copies of the project design blocks Pb1 and Pb4 are to be stored on the programming device 13. The software routine is functionally linked to the software tool and can be a component of this software tool. A user of the programming device 15 accordingly inputs into a memory of this programming device 15 a reference 18b, which indicates to the software routine of the management unit 12 that copies of the project design blocks Pb1, Pb2, Pb3 and Pb4 are to be made on the programming device 15 and are to be stored in the programming device 15. These references 18a, 18b are read out by the software routine, which automatically creates a copy of each of the project design blocks Pb2, Pb3 and two copies of each of the project design blocks Pb1, Pb4. Said routine then transmits appropriate copies to the programming devices 13, 15, which store these copies in memories of these programming devices 13, 15. It is possible that a copy of a project design block is already saved on a programming device and the programming device is connected to the bus 17 to continue the project design work. To prevent this copy from being automatically overwritten by a new copy transmitted by the management unit 12, a comparison routine of the programming devices 13, 14, 15, 16 initially compares the revision levels of the copies transmitted by the management unit 12 with the revision levels of the copies already stored. The present example shows that a reference 18c stored on the programming device 14 indicates to the software routine of the management unit 12 that a copy of the project design block Pb5 is to be transmitted to the programming device 14, and an identifier 19 in the reference 18c indicates to the software routine that said routine initially has to communicate the revision level of the project design block Pb5. The comparison routine of the programming device 14 compares the revision levels and, in case the revision level of the project design block Pb5 stored in the library should be later than the revision level of the copy stored in the programming device 14, a new copy of the project design block Pb5 is created, and the copy stored in the programming device 14 is overwritten by the new copy. It is then necessary for the user to request this new copy, e.g. by the comparison routine first displaying the compare result to the user on a display unit of the programming device 14 and inviting the user to request the new copy, e.g. by means of an appropriate keyboard entry. It is possible that copies of a project design block are intended to have the same revision level on all the programming devices. In this event, the user request is displayed on all the programming devices, a copy being transmitted to a programming device only if all the users of the programming devices acknowledge this request.

In the following it is assumed that a copy of a project design block is already saved on a programming device and that, in any event, it must be ensured that this copy is not updated, i.e. is not overwritten by a new copy. To prevent this copy from being inadvertently updated, the reference associated with this project design block can be cancelled. In the example it is assumed that, in the programming device 16, a reference 18d to the project design block Pb7 is cancelled, this being indicated in the drawing by the struckthrough reference characters Pb7. This means that the user of the programming device 16 works with the local copy of the project design block Pb7 for the design of the part project Tp4 and does not wish to have this copy updated. It is, moreover, advisable to cancel the reference 18d before setup of the connection between the programming device 16 and the management unit 12. In the example, what is required is merely an update of the copy of the project design blocks Pb6, Pb8 on the programming device 16, this being indicated to the software routine of the management unit 12 by means of a reference 18e.

Figure 3:
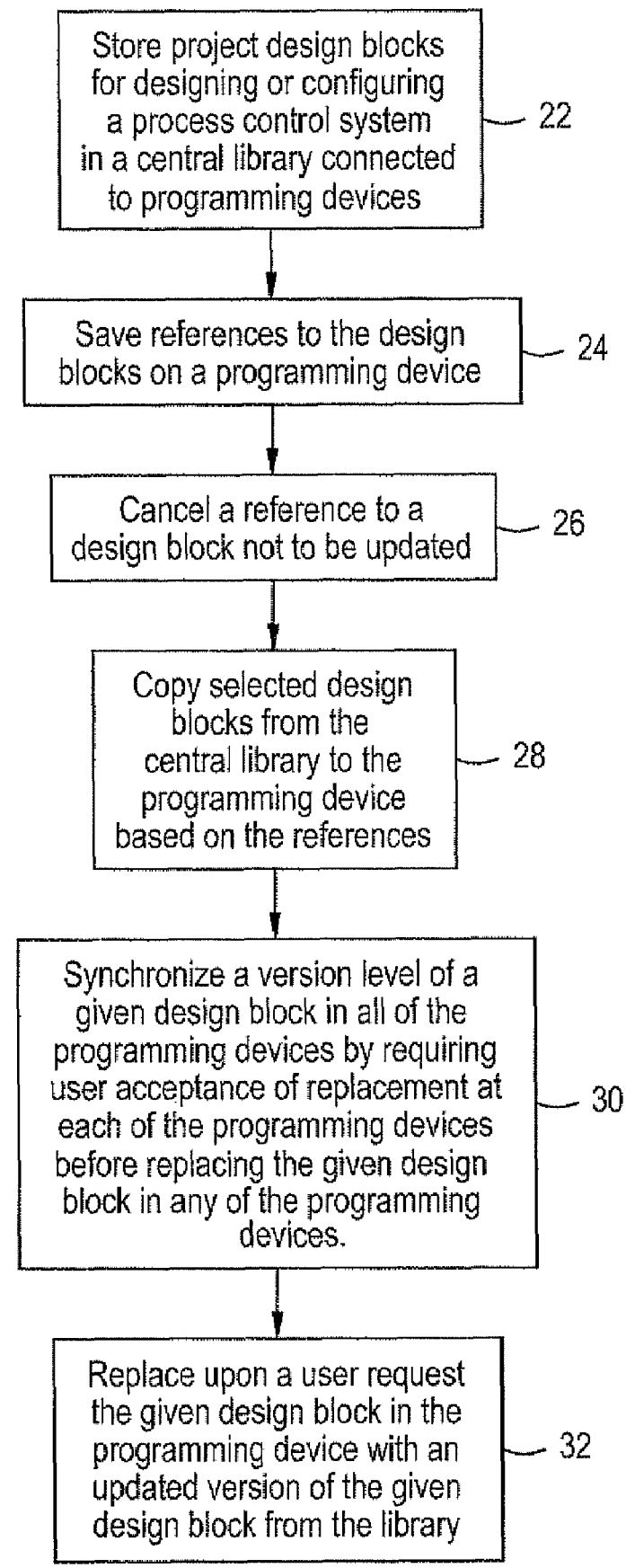
FIG. 3 illustrates aspects of a method according to the invention for designing or configuring a process control system.

FIG 3 illustrates aspects of a method 20 of the above-described invention, including the steps of: 22 Storing project design blocks for designing or configuring a process control system in a central library connected to programming devices; 24 Saving references to the design blocks on a programming device; 26 Canceling a reference to a design block not to be updated on the programming device from central library; 28 Copying selected design blocks from the central library to the programming device based on the references; 30 Synchronizing a version level of a given design block in all of the programming devices by requiring user acceptance of replacement at each of the programming devices before replacing the given design block in any of the programming devices; 32 Replacing upon a user request a given design block in the programming device with an updated version of the given design block from the central library.

The invention claimed is:

1. A plurality of programming devices for designing or configuring a process control system of actuators, sensors, programmable controllers, and operating and observation stations for controlling a plant, each programming device comprising a software tool configured to:
save references on the programming device, the references indicating project design blocks necessary for designing the process control system;
copy the necessary design blocks to the programming device from a central library of an engineering system via a bus system based on the references;
transfer the copied design blocks to the programming device; and
store the transferred design blocks on the programming device;
wherein the project design blocks comprise software objects representing operating and observation systems, input and output modules, the actuators, the sensors, and software blocks for creating control programs for the programmable controllers;
wherein a given design block is part of at least two different part projects executed on respective different ones of the programming devices, and a copy of the given design block is transferred to each of the respective programming devices; and
wherein the two part-projects are functionally linked for operational data transfer therebetween such that, during operation of the process control system for controlling a plant, data of a programmable controller designed or configured by a first of the part projects is exported to an operating and observation station designed or configured by a second of the part projects.

2. An engineering system for designing or configuring a process control system of actuators, sensors, programmable controllers, and operating and observation stations for controlling a plant, the engineering system comprising:
a management unit comprising a memory unit that stores a central library of project design blocks in the form of software objects comprising representations of operating and observation systems, input and output modules, the actuators, the sensors, and software blocks for creating control programs for the programmable controllers;
a plurality of programming devices connected via a bus system to the memory unit, each of the programming devices storing a respective set of copies of selected ones of the project design blocks as needed for designing or configuring a respective portion of the process control system; and
a software tool that copies the selected project design blocks from the central library to each programming device, and maintains references indicating which project design blocks are copied to each programming device;
wherein a given design block is part of at least two different part projects executed on respective different ones of the programming devices, and a copy of the given design block is transferred to each of the respective programming devices; and
wherein at least two of the part-projects on different programming devices are functionally linked for operational data transfer therebetween such that during operation of the process control system for controlling a plant, data of a programmable controller designed or configured by a first of the part projects is exported to an operating and observation station designed or configured by a second of the part projects.

3. The engineering system of claim 2, wherein the management unit defines a plurality of parts of a project for designing or configuring the process control system, each part comprising a given subset of the project design blocks, wherein the project parts are differently assigned to at least two of the programming devices.

4. The engineering system according to claim 3, wherein at least one of the programming devices has at least one of the project design blocks required for designing or configuring the process control system before the copied design blocks are transferred, and the software tool is further configured to:
compare a software version of the at least one project design block to a software version of a corresponding project design block stored in the library; and
replace upon a request by a user entered on said one programming device the at least one project design block with a copy of the corresponding project design block stored in the library, if the software version of the at least one project design block is older than the software version of the corresponding project design block stored in the library.

5. The engineering system according to claim 4, wherein the software tool is further configured to:
erase at least one of the references on said one programming device; and
block the replacement of such project design block corresponding to the erased referenced.

6. The engineering system according to claim 4, wherein:
the user request is displayed on each programming device, and
the at least one project design block is replaced by the corresponding project design block stored in the library if and only if the user request is accepted by a respective user via input at each of the programming devices.

7. The engineering system of claim 2, wherein the software tool protects certified copies of the design blocks in a given programming device from being inadvertently updated by canceling the references to the certified copies, while maintaining references to any of the project design blocks required for expansion of the process control system, wherein current project design blocks are only copied from the management unit to the given programming device that are needed for the expansion.

8. The engineering system of claim 2, further comprising a software routine on the management unit that transmits a user prompt to all of the programming devices when any of the programming devices requests an updated one of the project design blocks, wherein the software routine requires acceptance of the updated design block by a user of each of the programming devices via user input in response to the user prompt, wherein after receiving said acceptance from all of the programming devices the software routine transmits said updated one of the project design blocks to all of the programming devices, wherein a given revision level for said one of the project design blocks is synchronized on all of the programming devices.

9. A method of designing or configuring a process control system of actuators, sensors, programmable controllers, and operating and observation stations for controlling a plant, the method comprising:

providing an engineering system comprising a central management unit connected to a plurality of local programming devices by a bus system;

the central management unit dividing a project for designing or configuring the process control system into a plurality of part projects for execution on a respective plurality of the programming devices, each part project comprising at least one project design block, and at least some of the part projects comprising plural project design blocks;

storing the project design blocks in a central library of a memory unit of the central management unit, the programming devices configured to store local copies of such project design blocks required for designing or configuring the process control system;

saving a reference on each programming device indicating which project design blocks are to be copied from the library to the programming device;

copying the design blocks to be copied from the library to the programming device based on the reference, by the engineering system;

transferring the copied design blocks to the programming device, by the engineering system; and storing the transferred design blocks on the programming device;

wherein the project design blocks comprise software objects representing operating and observation systems, input and output modules, the actuators, the sensors, and software blocks for creating control programs for the programmable controllers;

wherein a given design block is part of more than one part project, and a copy of the given design block is transferred to more than one of the programming devices for concurrent use; and wherein part-projects on at least two different programming devices are functionally linked for operational data transfer therebetween.

10. The method according to claim 9, wherein at least one of the programming devices has at least one of the project design blocks required for designing or configuring the process control system before the copied design blocks are transferred, the method further comprising:

comparing a software version of the at least one project design block to a software version of a corresponding project design block stored in the library; and replacing upon request by a user entered on said one programming device the at least one project design block with a copy of the corresponding project design block stored in the library, if the software version of the at least one project design block is older than the software version of the corresponding project design block stored in the library.

11. The method according to claim 10, further comprising:

erasing at least one of the references on said one programming device; and blocking the replacement of such project design block corresponding to the erased referenced.

12. The method according to claim 10, wherein the user request is displayed on each programming device, and the at least one project design block on each local programming device is replaced by the corresponding project design block stored in the library if and only if the user request is accepted by the users of all programming devices.

* * * * *

UNITED STATES PATENT AND TRADEMARK OFFICE
CERTIFICATE OF CORRECTION

| | | |
|---|---|---|
| PATENT NO. | : 7,653,521 B2 | Page 1 of 1 |
| APPLICATION NO. | : 10/564210 | |
| DATED | : January 26, 2010 | |
| INVENTOR(S) | : Hans-Joachim Beck | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this

Twenty-third Day of November, 2010

David J. Kappos
*Director of the United States Patent and Trademark Office*